(12) United States Patent
MacInnis

(10) Patent No.: US 8,451,908 B2
(45) Date of Patent: May 28, 2013

(54) SYSTEM, METHOD, AND APPARATUS FOR DECODING FLEXIBLY ORDERED PIXEL ARRAYS

(75) Inventor: Alexander G. MacInnis, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 256 days.

(21) Appl. No.: 12/862,441

(22) Filed: Aug. 24, 2010

(65) Prior Publication Data

US 2010/0316132 A1  Dec. 16, 2010

Related U.S. Application Data

(63) Continuation of application No. 10/439,372, filed on May 16, 2003, now Pat. No. 7,813,431.

(60) Provisional application No. 60/382,267, filed on May 20, 2002.

(51) Int. Cl.
*H04N 7/18* (2006.01)

(52) U.S. Cl.
USPC .................................. 375/240.25; 375/240.26

(58) Field of Classification Search
USPC ........................................ 375/240.01–240.29
See application file for complete search history.

(56) References Cited

PUBLICATIONS

Wenger, S et al: "FMO: Flexible Macroblock Ordering" May 6, 2002, XP002308230, pp. 1-10.*

\* cited by examiner

*Primary Examiner* — Andy Rao
(74) *Attorney, Agent, or Firm* — Thomas | Horstemeyer, LLP

(57) ABSTRACT

Presented herein is a system and method for decoding flexibly ordered macroblocks. Slice groups are received, wherein the slice groups comprise non-contiguous macroblocks with respect to raster scan order. Each macroblock is associated with a particular context which serially provides each macroblock to a processor for decoding. The decoder selectively decodes the macroblock from the first context or second context, depending on which context includes the next macroblock in raster scan order.

20 Claims, 5 Drawing Sheets

| | 0 | 1 | 2 | --- | m-1 |
|---|---|---|---|---|---|
| 0 | 0 | 0 | 0 | 0 | 0 |
| 1 | 1 | 1 | 1 | 1 | 1 |
| 2 | 0 | 0 | 0 | 0 | 0 |
| . | | | | | |
| n-1 | 1 | 1 | 1 | 1 | 1 |

SYSTEM, METHOD, AND APPARATUS FOR DECODING FLEXIBLY ORDERED PIXEL ARRAYS

PRIORITY DATA

This application is a continuation of, and claims priority to, co-pendinq U.S. patent application Ser. No. 10/439,372 filed May 16, 2003 and entitled "SYSTEM, METHOD, AND APPARATUS FOR DECODING FLEXIBLY ORDERED MACROBLOCKS," which issued as U.S. Pat. No. 7,813,431 on Oct. 12, 2010, which claims the priority benefit of "A System for and Method of Decoding of Interleaved Macroblocks of Video", Provisional Application for U.S Patent, Ser. No. 60/382,267 filed May 20, 2002, by Macinnis, which are incorporated herein by reference in their entirety.

CROSS REFERENCE TO RELATED APPLICATIONS

This application is related to U.S. application Ser. Nos. 10/273,744, filed Oct. 18, 2002, and 10/141,569, filed May 8, 2002, each of which is incorporated herein by reference in its entirety.

FIELD OF THE INVENTION

The present invention is related to digital video compression, and more particularly to a system and method for decoding flexibly ordered macroblocks.

BACKGROUND OF THE INVENTION

A standard developed by the Moving Picture Experts Group (MPEG), known as MPEG, compresses digital video for transmission across a communication medium. Each picture comprises a two dimensional grid of picture elements (pixels), wherein each pixel is associated with a particular spatial location and stores color data associated therewith. Pursuant to the MPEG standard, each picture is subdivided into regions of 16×16 pixels. Each region is represented by a macroblock.

A macroblock stores luminance, and chrominance matrices that are mapped to the 16×16 pixels. The macroblocks are grouped into any number of slice groups or slices. The MPEG standard has been subjected to a number of updates and revisions, resulting in numerous versions. In a version known as MPEG-2, each of the slices contain macroblocks which are all in the same row and contiguous with respect to one another. The foregoing property permits transmission of a bit stream of the macroblocks in raster scan order by transmitting the slices in raster scan order. MPEG-2 also includes syntax indicating where each row in a picture begins. The indication of where each row in a picture begins permits decoding of multiple rows in parallel. Parallel decoding of multiple rows, known as multi-row decoding is especially useful for achieving a decoding rate sufficient for presentation of the video sequence on a video display.

More recent standards, such as the Joint Video Team (JVT) project of ISO-MPEG and ITU-VCEG, known as MPEG-4 Part 10 Advanced Video Coding and as ITU Rec.

H.264, and referred to here as AVC, provide much better compression than MPEG-2, in terms of compressed bit rate for a given level of quality. This makes the more recent standards attractive for commercial deployment. However, such standards are also much more complex to encode and decode than MPEG-2.

The AVC standard has a number of properties that make decoding substantially more complicated. For example, the macroblocks forming a slice are not necessarily spatially contiguous. Slices can include macroblocks that are throughout the entire picture, with macroblocks from other slices groups interspersed therebetween. The foregoing property is referred to here as Flexible Macroblock Ordering and is identified in the AVC standard by having more than one slice group in a picture. Additionally, new rows do not necessarily begin in a new slice and an AVC bitstream does not necessarily indicate where each row starts.

Flexible Macroblock Ordering is problematic because AVC also includes a filtering function known as loop filtering or deblocking. Loop filtering is applied to the entire decoded picture, requiring in general all upper and left neighbors of each macroblock to have been decoded before loop filtering of the macroblock can begin. While it might be possible to decode all the macroblocks of a picture in the order that the macroblocks were received, and then perform loop filtering, doing so prevents concurrent performance of decoding and loop filtering operations, and as a result the performance requirements of decoders of AVC are increased significantly, adding cost. Another problem with sequential performance of decoding and then loop filtering of a picture is that the amount of frame buffer memory required is increased, thereby adding cost to the decoding system.

Macroblocks within a slice include sequences of either variable length codes or alternatively sequences of arithmetic coded syntax elements using the content adaptive binary arithment coding (CABAC) format. In either case, the boundaries between macroblocks can only be determined by parsing substantially all syntax elements from the start of each slice. The boundaries are not assured to fall on convenient boundaries such as byte boundaries. In the case of CABAC, the problem is further aggravated because specific bits may not be assigned to syntax elements, and decoding of each syntax element depends on context established by decoding all previous syntax elements in the same slice.

Further limitations and disadvantages of conventional and traditional approaches will become apparent to one of skill in the art, through comparison of such systems with embodiments of the present invention as set forth in the remainder of the present application.

SUMMARY OF THE INVENTION

Presented herein is a system, method, and apparatus for decoding macroblocks of a particular picture in raster scan order, which are grouped and transmitted in arbitrarily different orders, such as provided for by Flexible Macroblock Ordering. A plurality of streams of compressed data are maintained simultaneously in a plurality of corresponding contexts, with each stream representing a different slice or slice group. The macroblocks are decoded in a desired order, such as raster scan order, by selecting the appropriate context.

These and other advantages and novel features of the present invention, as well as details of an illustrated embodiment thereof, will be more fully understood from the following description and drawings.

BRIEF DESCRIPTION OF THE SEVERAL VIEWS OF THE INVENTION

FIG. 3 is a table illustrating a picture mapped into interleaved slice groups;

DETAILED DESCRIPTION OF THE INVENTION

Although the foregoing embodiments are described in the context of the AVC standard, it should be noted that the present application is not limited to the AVC standard and is applicable in other situations where video is to be displayed.

Figure 1:
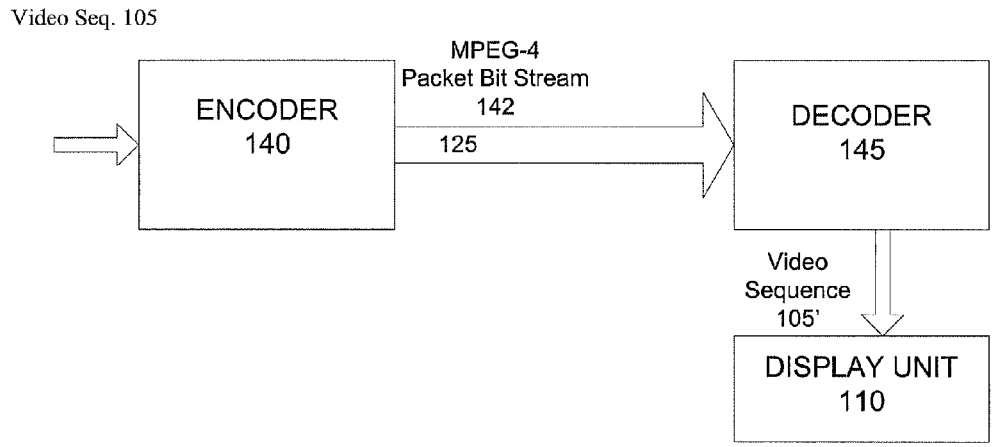
FIG. 1 is a block diagram of an exemplary video sequence transmission system.

Referring now to FIG. 1, there is illustrated a block diagram of an exemplary transmission system for providing a video sequence 105 to a display unit 110 over a communication medium 125. A video sequence 105 includes a series of images represented by frames. The frames comprise two-dimensional grids of pixels. An exemplary video sequence 105, such as a video sequence in accordance with ITU-656, includes 30 720×480 pixel frames per second. The foregoing results in a bit rate of approximately 165 Mbps for one video sequence. Additionally, the communication medium 125 often delivers multiple video sequences 105 to the display unit 110. The multiple video sequences 105 are transmitted together using a multiple access scheme, wherein each video sequence 105 is associated with a particular channel.

The communication medium 125 may comprise either a point-to-point link or a network of links, or any combination thereof. The network of links may include either a broadcast network, a switched network, or a packet switched network, such as the internet, or any combination thereof. The links may include, for example, a coaxial cable, an Ethernet connection, a Digital Subscriber Loop (DSL), an optical fiber, a satellite/radio link, or a phone line. As the number of video sequences 105 which are transmitted on the communication medium 125 are increased, the bandwidth requirements for the communication medium 125 are further increased. Accordingly, a number of data compression standards have been promulgated.

One of the most popular standards was developed by the Moving Pictures Experts Group (MPEG), and is known as MPEG. The MPEG standard has numerous variants and has also been subject to revisions from time to time. One of the MPEG standards, MPEG-4, Part 10, is known as Advanced Video Coding (AVC). The encoder 140 receives and encodes the video sequence 105 pursuant to the AVC standard. The AVC standard is described in document JVT G-050, which is incorporated by reference herein, in its entirety. Pursuant to the AVC standard, the video sequence 105 is represented by an AVC bitstream 142. The AVC bitstream 142 is transmitted over the communication medium 125 and received by a decoder 145. The decoder 145 decodes the AVC bitstream 142, providing video sequence 105' that may be imperceptibly different from video sequence 105 to the human eye. The video sequence 105' is provided for display to the display unit 110.

Figure 2:
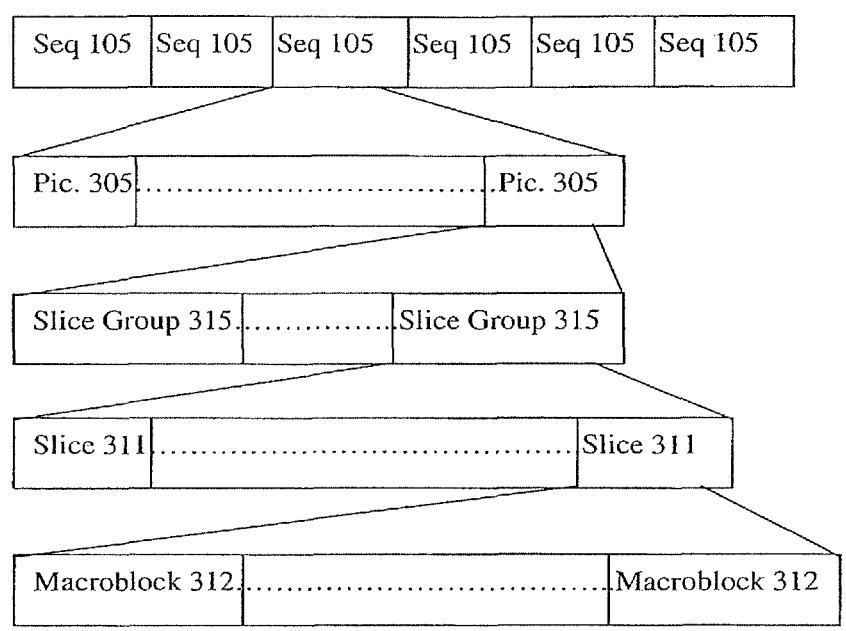
FIG. 2 is a block diagram of the AVC video stream hierarchy.

Referring now to FIG. 2, there is illustrated a block diagram of the AVC stream 142 hierarchy. A video sequence 105 includes an encoded representation of a series of pictures 305.

The pictures 305 are divided into slice groups 315, wherein each slice group 315 includes one or more slices 311, and each slice 311 contains any number of encoded macroblocks 312. In AVC, the macroblocks 312 forming a slice group 315 are not necessarily spatially contiguous. Slice groups 315 may include macroblocks 312 that are throughout the entire picture 305 with macroblocks 312 from other slices groups 315 interspersed therebetween. The foregoing is known as Flexible Macroblock Ordering.

Figure 4:
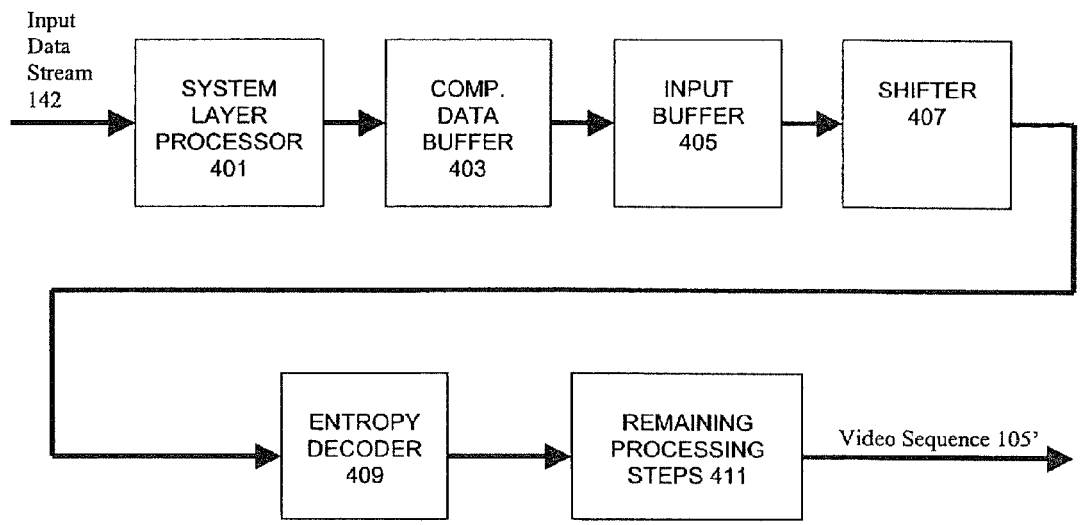
FIG. 4 is a block diagram of an exemplary decoder system.

Referring now to FIG. 3, there is illustrated an exemplary picture 305 comprising macroblocks 312. The macroblocks 312 are mapped to the picture 305 forming any number of sequential rows 360 of macroblocks 312. In the illustration, the macroblocks 312 in the even-numbered rows 360 are in slice group 0, while the macroblocks 312 in odd-numbered rows 360 are in slice group 1. The macroblocks 312 are transmitted over the communication medium 125 to the decoder 145. The macroblocks 312, as transmitted, are organized by slice groups 315. For the interleaved slice group scheme in FIG. 3, the macroblocks are transmitted in the following order:

$312_{0,0}, 312_{0,1} \ldots 312_{0,m-1}$, (Slice Group 0)
$312_{2,0}, 312_{2,1} \ldots 312_{2,m-1} \ldots$
$312_{n-2,0}, 312_{n-2,1} \ldots 312_{n-2,m-1}$,
$312_{1,0}, 312_{1,1} \ldots 312_{1,m-1}$, (Slice Group 1)
$312_{3,0}, 312_{3,1} \ldots 312_{3,m-1} \ldots$
$312_{n-1,0}, 312_{n-1,1} \ldots 312_{n-1,m-1}$ Referring now to FIG. 4, there is illustrated a block diagram of an exemplary decoder 145. A system layer processor 401 receives the AVC bit stream 142 containing compressed video data, extracts the compressed video data and places the compressed video data in the compressed data buffer (CDB) 403. The CDB 403 is typically a structure in general-purpose memory, such as DRAM for example. Input buffer 405 may be a physical buffer dedicated for the purpose of buffering data, or it may be a function of a data cache or other data memory.

In one embodiment, a shifter 407 performs the function of aligning selected bits of data to appropriate bit positions of the entropy decoder 409. Entropy decoder 409 performs the function of decoding the entropy coding of the bit stream 142. Typically entropy coding uses variable length coding (VLC), and the entropy decoder 409 is a variable length decoder (VLD). The entropy coding may be arithmetic coding, and the decoding process may therefore be arithmetic decoding. The entropy decoder 409 may be implemented as hardware designed for this purpose, or it may be implemented as software on a programmable processor, or some combination thereof.

The remaining processing steps, as indicated by reference numeral 411, comprise all the processing functions not yet listed which are required for decoding the compressed video format of interest. These functions can include inverse scan order, inverse quantization, mismatch control, inverse discrete cosine transform (DCT), and motion compensation with pixel filtering and reconstruction. The foregoing functions may be implemented in a variety of ways, including specialized hardware, software controlling a programmable processor, or a combination thereof.

Figure 5:
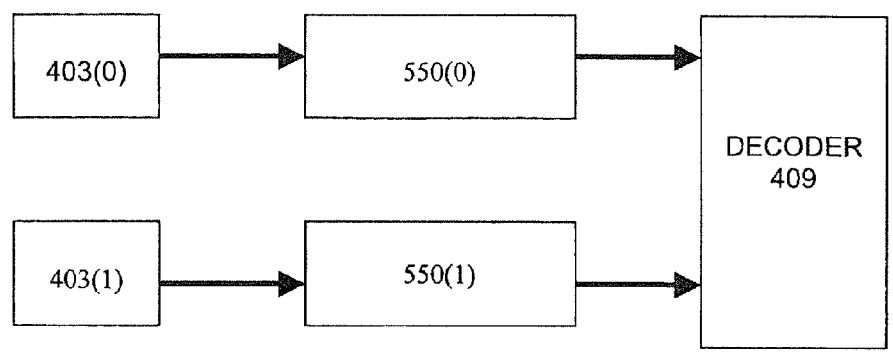
FIG. 5 is a block diagram of an exemplary data structure for providing macroblocks to the decoder in accordance with an embodiment of the claimed invention.

Referring now to FIG. 5, there is illustrated a data structure for providing macroblocks 312 to the entropy decoder 409 in accordance with one embodiment of the present invention. The macroblocks 312 are stored in a CDB 403 which receives at least a portion of the bitstream 142 of AVC data comprising all of the macroblocks associated with a particular picture 305.

As noted above, the macroblocks 312 as transmitted over the communication medium 125 to the decoder are organized by slice group 315, e.g., slice group 0, slice group 1. One portion 403(0) in the CDB 403 may be associated with one slice group 315, while a second portion 403(1) in the CDB 403 may be associated with a second slice group 315. Each slice group 315 contains a number of macroblocks 312.

Each slice group 315 is associated with a first-in-first-out (FIFO) queue 550(0), 550(1). Each FIFO queue 550 queues the macroblocks 312 from the slice group 315 associated therewith. For example, in the interleaved macroblock scheme of FIG. 3, slice group 0 can be associated with FIFO queue 550(0) and slice group 1 can be associated with FIFO queue 550(1).

The entropy decoder 409 decodes the macroblocks 312 in raster scan order. As noted above, the slice groups 315 do not necessarily comprise macroblocks that are continuous in raster scan order. During the encoding process, the mapping scheme of the macroblocks to slice groups 315 is recorded. The record of the mapping scheme is provided in the input stream. The mapping scheme indicates the slice group 315 associated with each macroblock 312. The entropy decoder 409 can use this information to determine the slice group 315 associated with the next macroblock 312 in the raster scan order. Based on the indication, the entropy decoder 409 selects the queue 550 associated with the slice group 312 that includes the next macroblock 312 in raster scan order.

For example, in the macroblock interleaving scheme of FIG. 3, macroblocks $312_{0,0}, \ldots 312_{0,m-1}, 312_{2,0}, \ldots 312_{2,m-1}, 312_{4,0}, \ldots 312_{4,m-1}, \ldots 312_{x-2,0}, \ldots 312_{x-2,m-1}$ are stored in FIFO queue 550(0), while macroblocks $312_{1,0}, \ldots 312_{1,m-1}, 312_{3,0}, \ldots 312_{3,m-1}, 312_{5,0}, \ldots 312_{5,m-1}, \ldots 312_{x-1,0}, \ldots 312_{x-1,m-1}$. are stored in FIFO queue 550(1). Macroblock $312_{0,0}$ is first in raster order. According to the mapping scheme macroblock $312_{0,0}$ is in slice group 0. Therefore, the entropy decoder 409 selects FIFO queue 550(0) and FIFO queue 550(0) provides macroblock $312_{0,0}$ to the entropy decoder 409. According to the mapping scheme, the next macroblock $312_{0,1}$ is also in slice group 0. Therefore, the entropy decoder 409 selects FIFO queue 550(0) and FIFO queue 550(0) provides macroblock $312_{0,1}$ to the entropy decoder 409. The entropy decoder 409 continues to select FIFO queue 550(0) until macroblock $312_{0,m-1}$. After macroblock $312_{0,m-1}$, macroblock $312_{1,0}$ is the next macroblock in the raster scan order. According to the mapping scheme, the next macroblock $312_{1,0}$ is in slice group 1. Therefore, the entropy decoder 409 selects FIFO queue 550(1) and FIFO queue 550(1) provides macroblock $312_{1,0}$ to the entropy decoder 409.

Figure 6:
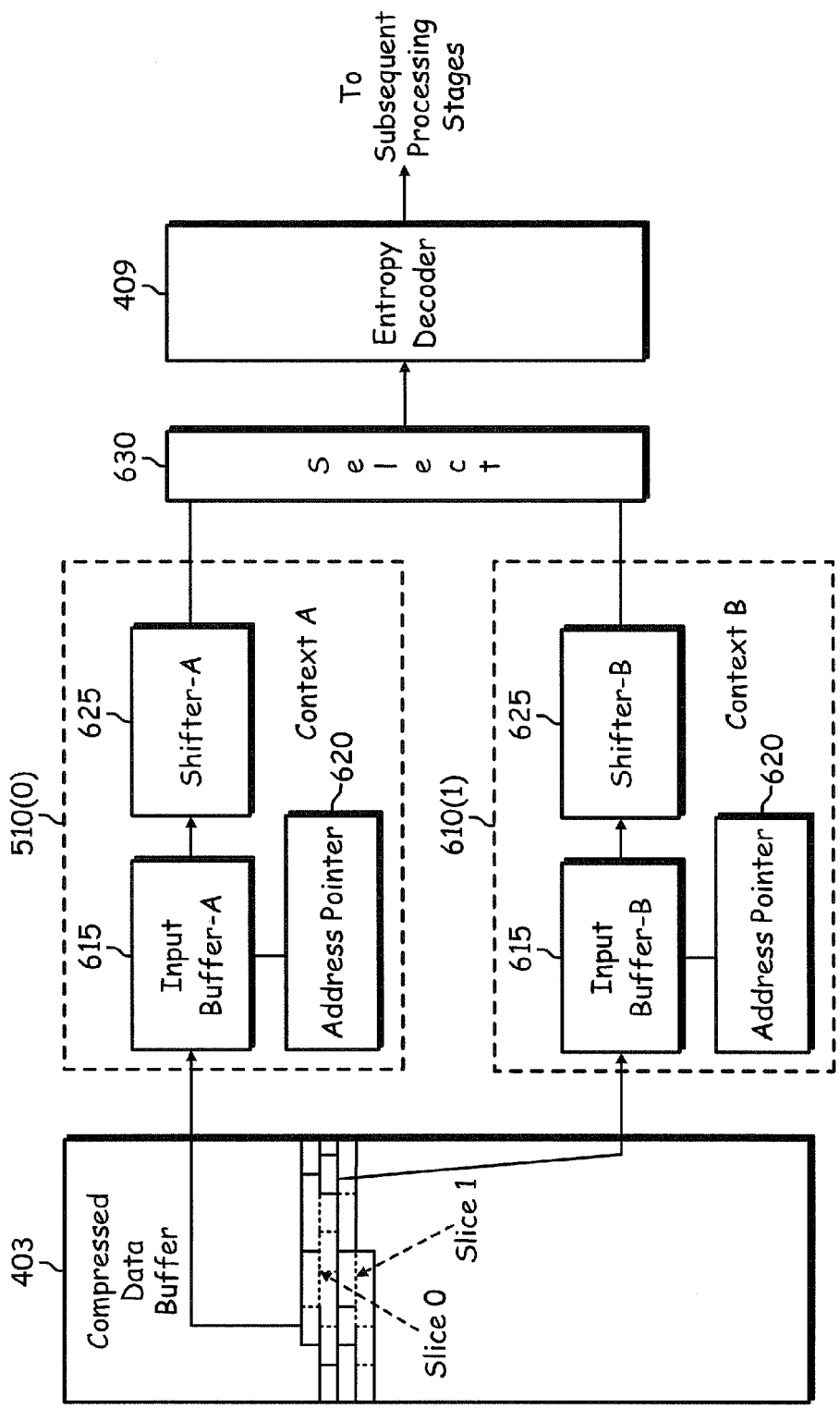
FIG. 6 is a block diagram of a circuit for providing macroblocks to the decoder in accordance with an embodiment of the claimed invention.

Referring now to FIG. 6, there is illustrated a block diagram of a circuit for providing the macroblocks 312 to the entropy decoder 409. The decoder 145 includes compressed data buffer 403. The compressed data buffer includes one portion 403(0) associated with one slice group 315, e.g., slice group 0, and another portion 403(1) associated with a second slice group, e.g., slice group 1. The decoder includes a plurality of contexts 610(0), 610(1) each of which is associated with a particular one of the slice groups. For example, in the interleaved macroblock scheme of FIG. 3, context 610(0) can be associated with slice group 0, while context 610(1) can be associated with slice group 1.

Each context 610 includes an input buffer 615 for buffering data from the associated slice group 315, an address pointer 620 pointing to a memory location in the compressed data buffer 403, and a shifter 625 for shifting data from the input buffer 615 to the entropy decoder 409. As the data is shifted from the input buffer 615 to the entropy decoder 409, the address pointer 620 is appropriately incremented to point to the next address to be read in the compressed data buffer 403. The data following the address pointed to by the address pointer 620 is placed in the input buffer 615. There are also address pointers 620 that control the input buffer 615 and the shifter 625 position. The state of the context, including the CDB address pointer, input buffer pointers, and shifter position are all retained and restored when the context is again switched in.

Transfer of the macroblocks 312 is controlled by a selector 630. The entropy decoder 409 selects the context 610 associated with the slice group that includes the first macroblock $312_{0,0}$ of a picture, in raster scan order, e.g., context 610(0) associated with slice group 0. The macroblocks 312 of the slice group 315 are provided to and decoded by the entropy decoder 409.

Each slice group 315 is associated with a particular context 610(0), 610(1). Each context 610(0), 610(1) stores the macroblocks 312 from the slice group 315 associated therewith. For example, in the interleaved macroblock scheme of FIG. 3, slice group 0 can be associated with context 610(0) and slice group 1 can be associated with context 610(1).

The entropy decoder 409 decodes the maroclocks 312 in raster scan order. As noted above, the slice groups 315 do not necessarily comprise macroblocks that are continuous in raster scan order. During the encoding process, the mapping scheme of the macroblocks to slice groups 315 is recorded. The record of the mapping scheme is provided in the input stream. The mapping scheme indicates the slice group 315 associated with the next macroblock in the raster scan order. Based on the indication, the entropy decoder 409 selects the context 610 associated with the slice group that include the next macroblock in raster scan order.

For example, in the macroblock interleaving scheme of FIG. 3, macroblocks $312_{0,0}, \ldots 312_{0,m-1}, 312_{2,0}, \ldots 312_{2,m-1}, 312_{4,0}, \ldots 312_{4,m-1}, \ldots 312_{x-2,0}, \ldots 312_{x-2,m-1}$ are stored in context 610(0), while macroblocks $312_{1,0}, \ldots 312_{1,m-1}, 312_{3,0}, \ldots 312_{3,m-1}, 312_{5,0}, \ldots 312_{5,m-1}, \ldots 312_{x-1,0}, \ldots 312_{x-1,m-1}$. are stored in context 610(1). Macroblock $312_{0,0}$ is first in raster order. According to the mapping scheme macroblock $312_{0,0}$ is in slice group 0. Therefore, the entropy decoder 409 selects context 610(0) and context 610(0) provides macroblock $312_{0,0}$ to the entropy decoder 409. According to the mapping scheme, the next macroblock $312_{0,1}$ is also in slice group 0. Therefore, the entropy decoder 409 selects context 610(0) and context 610(0) provides macroblock $312_{0,1}$ to the entropy decoder 409. The entropy decoder 409 continues to select context 610(0) until macroblock $312_{0,m-1}$. After macroblock $312_{0,m-1}$ is decoded by the entropy decoder 409, macroblock $312_{1,0}$ is the next macroblock in the raster scan order. According to the mapping scheme, the next macroblock $312_{1,0}$ is in slice group 1. Therefore, the entropy decoder 409 selects context 610(1) and context 610(1) provides macroblock $312_{1,0}$ to the entropy decoder 409.

Figure 7:
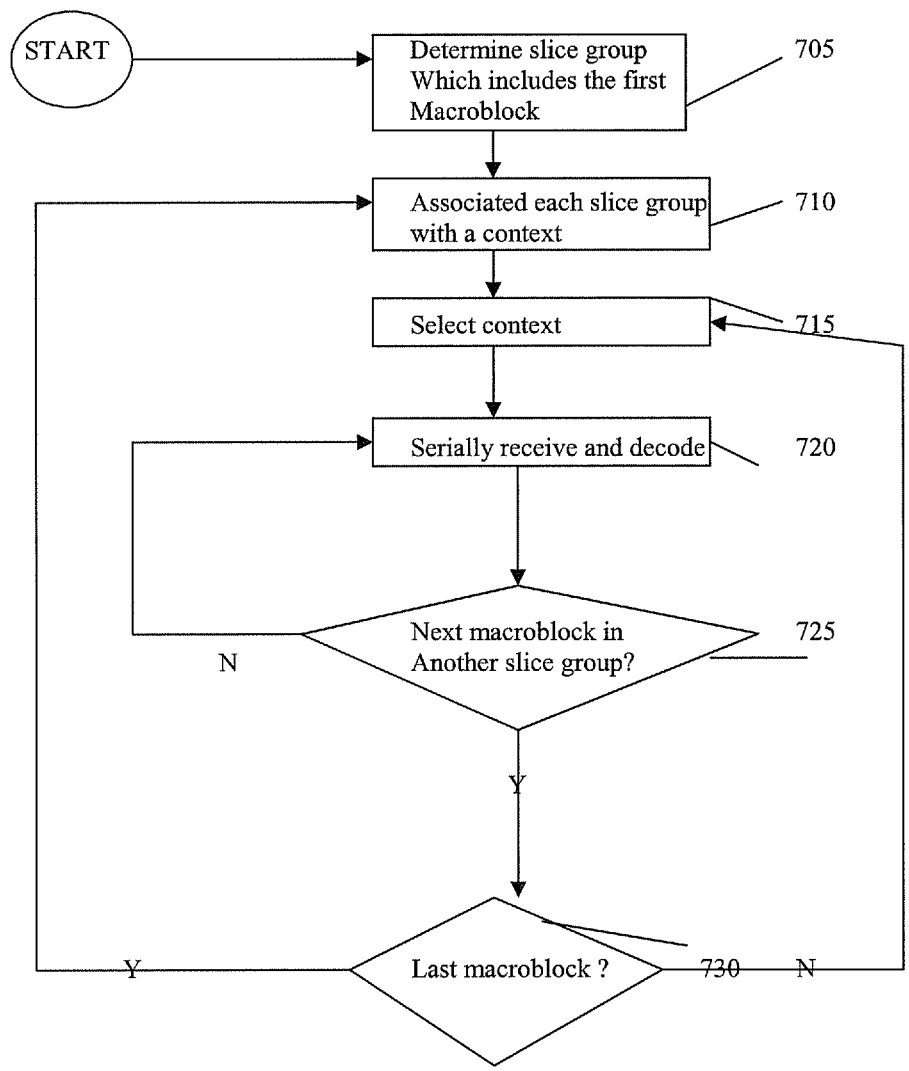
FIG. 7 is a flow diagram describing the decoding of a bit stream with flexible macroblock ordering.

Referring now to FIG. 7, there is illustrated a flow diagram describing the decoding of the macroblocks. At each new picture, the entropy decoder 409 determines the slice group 315 that includes the first macroblock $312_{0,0}$ of the picture 305 (705). At 710, the entropy decoder 409 associates each slice group 315 with a particular context 610, and the context 610 loads the input buffer 615 of each context 610 with at least a portion of each associated slice group 315. For example, context 610(0) is associated with slice group 0, while context 610(1) is associated with slice group 1.

The selector 630 selects (715) the context 610 associated with the slice group 315 which includes the first macroblock $312_{0,0}$, e.g., context 610(0) associated with slice group 0, and serially receives and decodes the macroblocks 312 therein (720). The macroblocks 312 in the context 610(0) are received and decoded until the next macroblock 312 in raster order is determined to be in another slice group (725), e.g., slice group 1.

When the next macroblock 312 in raster order is determined to be in another slice group 315, the entropy decoder selects the context 610 associated with the slice group including the next macroblock in raster order (715), e.g., context 610(1) associated with slice group 1, and repeats 720-725 for the next slice group. The foregoing, 715-725 are repeated until the last macroblock in the picture is decoded (730). When the last macroblock of the picture is decoded, 705-730 are repeated for the next picture.

Decoding with two or more concurrent input streams can optionally be combined with the pre-processor method disclosed in incorporated applications Ser. No. 10/273,744, now issued as U.S. Pat. No. 7,305,036, and Ser. No. 60/380,520 to improve the decoder's ability to decode multiple slices with arbitrarily interleaved macroblocks. The pre-processor can determine where the slices begin and end in the decoder's coded data buffer, and which macroblocks are in which slices, and provide information to the decoder that allows it to maintain the appropriate data in the appropriate context of the decoder. This is particularly useful when the number of slices or slice groups that need to be processed concurrently exceed the number of contexts the decoder can support simultaneously. This is also useful when the slices are transmitted in arbitrary order. In addition, the pre-processor can re-order the compressed data. For example, the pre-processor can transcode the entropy coded input stream into a different entropy coded bit stream, and in so doing can also change the order of the data such that the result is in the order desired by the decoder (such as, for example, raster scan order).

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

What is claimed is:

1. A system comprising:
    memory for storing a first group of pixel arrays and a second group of pixel arrays;
    a first queue for serially shifting at least one pixel array from the first group;
    a second queue for serially shifting at least one pixel array from the second group; and
    a processor for selectively decoding pixel arrays from either the first queue or the second queue.

2. The system of claim 1, wherein the processor decodes the pixel arrays of the first queue responsive to determining that a next pixel array in raster scan order is in the first group.

3. The system of claim 2, wherein the processor decodes the pixel arrays of the second queue responsive to determining that a next pixel array in raster scan order is in the second group.

4. The system of claim 1, further comprising:
    a selector for selecting one of the first queue or the second queue.

5. The system of claim 1, wherein the first queue further comprises:
    an input buffer for storing pixel arrays of the first queue in a sequential order; and
    a shifter for serially outputting the pixel arrays of the first queue in the sequential order.

6. The system of claim 5, wherein the first queue further comprises:
    an address pointer for pointing to a sequentially next pixel array; and
    wherein the shifter outputs the pixel array pointed to by the address pointer.

7. A circuit comprising:
    memory for storing a first group of pixel arrays and a second group of pixel arrays;
    a first queue operatively coupled to the memory, wherein the first queue stores at least a portion of a pixel array from the first group;
    a second queue operatively coupled to the memory, wherein the second queue stores at least a portion of a pixel array from the second group;
    at least one processor operatively coupled to the first queue and the second queue; and
    wherein the circuit is configured to:
        decode the at least a portion of a pixel array from the first queue; and
        decode the at least a portion of a pixel array from the second queue, wherein a pixel array immediately following the at least a portion of a pixel array from the first queue in raster order is in the second group.

8. The circuit of claim 7, wherein the first queue further comprises:
    an input buffer for storing pixel arrays of the first queue in a sequential order; and
    a shifter for serially outputting the pixel arrays of the first queue in the sequential order.

9. The circuit of claim 7, further configured to:
    decode at least another portion of a pixel array from the first queue, wherein a pixel array immediately following the at least a portion of a pixel array from the second queue is in the first group.

10. A method comprising:
    receiving a first group of pixel arrays and a second group of pixel arrays at a decoder;
    decoding at least one pixel array of the first group;
    decoding at least one pixel array of the second group, wherein a pixel array immediately following in a raster scan order the at least one pixel array in the first group is in the second group; and
    decoding at least another pixel array of the first group, if the at least another pixel array immediately following in the raster scan order the at least one pixel array of the second group is in the first group.

11. The method of claim 10, wherein receiving the first group of pixel arrays and the second group of pixel arrays further comprises:
    queuing at least a portion of the pixel arrays of the first group; and
    queuing at least a portion of the pixel arrays of the second group.

12. The method of claim 10, wherein decoding the at least one pixel array from the first group further comprises:
    serially receiving the at least one pixel array from the first group from a queue.

13. A system, comprising:
    a first context that receives pixel arrays from a first group, wherein the first group contains pixel arrays in a non-raster order, and prepares the pixel arrays for a subsequent decoding function; and
    a second context that receives pixel arrays from a second group, the second group containing pixel arrays in a non-raster order, and prepares the pixel arrays for the subsequent decoding function, wherein pixel arrays upon which the subsequent decoding function is performed are in a raster scan order.

14. The system of claim 13, wherein the first context further comprises:
an input buffer for storing pixel arrays of the first context in a sequential order; and
a shifter for serially outputting the pixel arrays of the first context in the sequential order.

15. The system of claim 14, wherein the second context further comprises:
an input buffer for storing pixel arrays of the second context in a sequential order; and
a shifter for serially outputting the pixel arrays of the second context in the sequential order.

16. The system of claim 1, further comprising:
a pre-processor configured to convert a first bit stream into a second bit stream, the first bit stream being reordered into raster scan order in the second bit stream by the conversion; and
wherein the first and second groups of pixel arrays are obtained from the second bit stream.

17. The system of claim 1, further comprising:
a pre-processor configured to provide data indicating slice positioning for the first and second pixel arrays to the processor.

18. The circuit of claim 7, further configured to:
convert a first bit stream into a second bit stream, the first bit stream being reordered into raster order in the second bit stream by the conversion; and
wherein the first and second groups of pixel arrays are obtained from the second bit stream.

19. The circuit of claim 7, further comprising:
a pre-processor configured to provide data indicating slice positioning for the first and second pixel arrays to the at least one processor.

20. The method of claim 10, further comprising:
converting a first bit stream into a second bit stream, the first bit stream being reordered into raster scan order in the second bit stream by the converting; and
wherein the first and second groups of pixel arrays are received from the second bit stream.

* * * * *